July 25, 1950     M. J. SPENDLOVE     2,516,657
ELECTRIC TEST PROBE
Filed Aug. 25, 1947
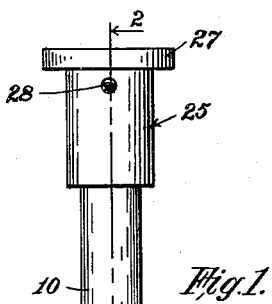
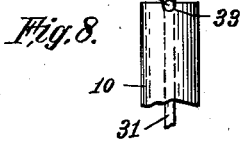
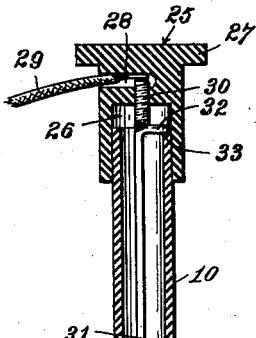
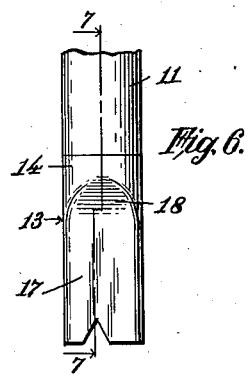
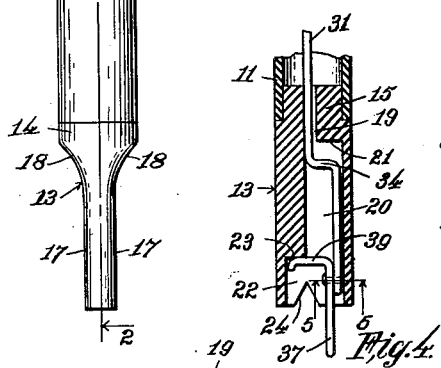
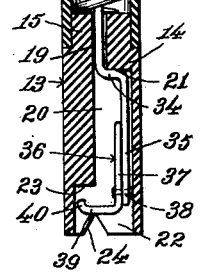
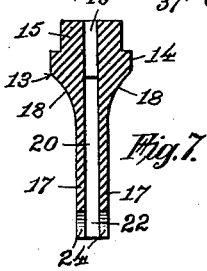
INVENTOR.
Max J. Spendlove
BY Royal E. Burnham
ATTORNEY.

Patented July 25, 1950

2,516,657

UNITED STATES PATENT OFFICE 2,516,657

ELECTRIC TEST PROBE

Max J. Spendlove, Salt Lake City, Utah

Application August 25, 1947, Serial No. 770,448

4 Claims. (Cl. 173—273)

This invention relates to electric test probes adapted for use with electrical measuring instruments and other equipment to connect them with circuits of other instruments or equipment.

In testing parts of radio and comparable devices it is necessary to connect the part or parts to be tested to a suitable measuring instrument, for example, and this is best accomplished by means of test probes attached as termini to flexible conductors extending from the instrument.

However, as in modern radios and other electrical apparatus the parts usually are compacted into small space, and the numerous lead wires are closely arranged, it is ordinarily difficult to make necessary connections to parts to be tested without shorting the circuits thereto or other components, with probable injury to them.

An object of the invention is to provide a test probe of the class mentioned, of such construction that a connection readily may be made to any part to be tested without disturbing or disarranging any of the wires or other parts of the apparatus, and without liability of shorting any of the circuits.

A further object of the invention is to provide a device with which a temporary fixed connection readily may be made to a difficultly accessible lug, terminal, wire, or other electrical element.

Another object of the invention is to provide a device of this class that has retractable means for gripping a portion of the instrument or apparatus to be tested, and of such construction that the device may be threaded into position with the gripper retracted within the device, and then actuated to grip the desired element.

It also is an object of the invention to provide, in an electric test probe, a conductor having a terminal part that may be adjusted for use either as a gripper or as a "plug-in" or "touch" connection.

Particularly, it is an object of the invention to provide a test probe equipped with a gripper element that will securely connect the device to the desired electric element without danger of being accidently detached.

Moreover, it is an object to provide a device of this kind of such form that the gripper, when attached to a wire or similar part, will be retracted within an insulating part of the probe.

Having in view the foregoing and other objects, the invention provides a device that comprises a tubular member of insulating material, a conductor extending longitudinally therein and provided at one end with a gripping element, means normally holding the gripping element in retracted position within the tubular member, and means for projecting the gripping element to engage a part to be contacted.

The invention further provides a device that includes a pair of telescopic tubular members of insulating material, a nose element at the lower end of the outer tubular member, a cap at the upper end of the inner tubular member, and a conductor rod attached to the cap.

The conductor rod extends longitudinally through the telescopic members and terminates at the lower end in a contact member normally retracted within the nose element and adapted to be projected beyond the end of that element to engage and grip a part of a device to be tested.

The invention also provides a device characterized by notches in the end of the nose element to receive a wire or comparable element to be gripped, and of sufficient depth to permit retraction of the contact member within the nose while in clamping action.

When considered with the description herein, characteristics of the invention are apparent in the accompanying drawing, forming part hereof, wherein an adaptation of the invention is disclosed for purposes of illustration.

Like reference-characters refer to corresponding parts in the views of the drawing, of which:

Fig. 1 is an elevation of a test probe embodying my invention;

Fig. 2 is a section on line 2—2, Fig. 1;

Fig. 3 is a detail section of the lower end or nose portion of the probe, illustrating the contact element engaging and clamping a lead wire;

Fig. 4 is a view similar to Fig. 3, but showing the contact element in position for use in making "touch" tests or as a "plug-in";

Fig. 5 is a section on line 5—5, Fig. 4;

Fig. 6 is a side elevation of the lower or nose end of the probe;

Fig. 7 is a section on line 7—7, Fig. 6;

Fig. 8 is a detail elevation of the upper part of the inner telescopic member and the adjacent portion of the conductor rod.

Referring to the drawing, 10 and 11 designate a pair of telescopic tubular insulating members, which together compose the body portion of the device. The inner tubular member 10, which will be referred to as the upper body member, has a close sliding fit within the outer or lower member 11. The lower member 11 is formed with a flange 12, preferably at the upper end thereof, for a purpose hereinafter described.

The lower end of the lower member 11 terminates in a nose piece 13, which preferably is formed as a separate element. The upper portion 14 of the nose piece is of uniform diameter with the tubular member 11 to which it is attached. It is formed with a reduced cylindrical extension 15, which preferably is press-fitted into the lower end of the tube 11, as illustrated in Figs. 2, 3, and 4 of the drawing.

A coil spring 16 in the lower tube 11 is interposed between the lower or inner end of the upper tube 10 and the end of the nose-piece extension 15. This spring urges the tube 10 outwardly in the tube 11.

The nose piece 13 terminates in a lower flattened portion defined by parallel side walls 17—17, which merge upwardly into the portion 14 by curved faces 18 to facilitate nosing or threading the end of the device between lead wires or other elements of apparatus being tested. The upper end of the nose piece has a substantially axial bore 19, which communicates with a chamber 20 between the walls 17, and which is laterally offset and affords a shoulder 21. Adjacent to the lower end of the nose piece chamber 20 is off-set in the opposite direction, affording a widened recess 22, and affording a shoulder 23 at the upper end thereof. The lower edges of the walls 17 have V-shaped notches 24 to receive a wire, lug, or other similar portion of the part being tested, as will be explained more particularly hereinafter.

A cap 25 is telescopically and rotatably mounted over the upper end of the tubular member 10. The cap has a cylindrical recess 26 to receive the upper end of the member 10, and it also has a peripheral flange 27 at its upper end. Below the flange 27, the cap contains a radial recess or passage 28 to receive the bared end of a flexible conducting wire or cable 29 leading from a measuring instrument or other device with which the probe is being operated.

Threaded axially in the cap, from the recess 26 to the recess 28, is a screw 30, the lower end of which is secured, as by soldering, to the upper portion of a stiff conducting wire or rod 31. This rod extends downwardly through the tubular members 10 and 11 to the nose piece 13. The rod is bent laterally at its upper end as an arm 32, which seats in a notch 33 in the upper edge of the member 10, so that, by relative rotation of the cap 25 and the member 10, the screw 30 will operate to bind or to release the end of the wire or cable 29.

The rod 31, adjacent to its lower end, extends through the bore 19 in the upper portion of the nose piece, and below the bore it is off-set within the chamber 20 as a stop shoulder 34, from which downwardly extends a straight terminal portion 35, to which a contact element 36 is attached.

The contact element 36 is designed to be used selectively either as a gripper for attaching the device to a wire, lug, or other element, or for plug-in and touch-test purposes. To this end, the element comprises a straight portion 37, for plug-in and contact functions, which is mounted pivotally against the inner face of the rod terminal part 35 by a pin 38, and a transverse gripper portion or hook 39 at substantially right angles thereto. The straight portion 37 of the contact element 36 is adapted to be plugged into holes in parts and to be inserted in between parts carrying or supposed to be carrying electric current and at its tip to touch such parts to test them. Thus, for convenience, the straight portion 37 is referred to herein as a "plug-in" and "touch" element. The pin 38 extends through the rod part 35 near its end through the contact element near the gripper portion 39. The contact element thus may be turned through an angle of 180 degrees, so that either its straight part 37 or its hook part 39 may be positioned below the pin 38. This adjustment easily may be made when the end 35 of the rod 31 is projected sufficiently beyond the end of the nose piece 13. The terminal portion 35 of the rod, to which the contact element 36 is preferably slightly flattened, as seen in Fig. 5, as also may be the adjacent portion of the contact member.

The stop 34 of the rod 31, in contact with the shoulder 21 of the nose piece, prevents the spring 16 from expelling the body member 10 from the body member 11. The straight portion of the rod 31 between its upper lateral arm 32 in the notch 33 in the end of the body member 10 and its stop shoulder 34 is of such length that, when that shoulder is against the shoulder 21 of the nose piece, the hook part 39 of the contact element is entirely housed in the nose piece, as seen in Fig. 2.

When the contact member 36 is turned so that its gripper part 39 is in use position, as seen in Figs. 2 and 3, the straight plug-in or contact portion 37 extends inwardly along and in abutment with the inner face of the rod terminal portion 35; and, when the plug-in or contact portion 37, is extended for use, as seen in Fig. 4, the gripper portion is retracted into the recess 22 until it engages the shoulder 23.

In operating the device for grasping a conductor or other part of an apparatus being investigated, the lower body member 11 is held between adjacent fingers with the flange 12 resting on the palm side thereof, and the thumb resting on the end of cap 25. The nose of the device then is moved into position adjacent to the element to be clamped. As the contact element of the device then is entirely within the nose piece, this positioning of the probe readily may be accomplished without danger of shorting any of the circuits or other components that may be contacted by the probe. When the probe is in proper position, the thumb and fingers holding the device are drawn toward each other and the body members 10 and 11 are telescoped against action of spring 16, whereby the gripper 39 is projected beyond the end of the nose. Then the gripper may be engaged under the wire or other element to be gripped. Upon releasing the manual compression of the device, the gripper is retracted by action of spring 16, and the wire or the like is clamped firmly between the hook 39 and the end of the nose under full urge of the spring.

In order readily to position the hook 39 under a wire or the like, and to hold it until clamped, the hook is formed with a slightly upturned terminal 40.

When hooking on or clamping to a wire or other slender element, the element may be drawn into the notches 24, as illustrated in Fig. 3, wherein 41 indicates a wire, and then the contact element is within the chamber 22.

The transverse dimension of the chamber 20 and recess 22, that is the distance between the parallel inner faces of the walls 17, is only slightly greater than the diameter of the rod 31. Thus, the stop portion 34 of the rod prevents rotary movement of the rod, and, therefore, maintains the gripper 39 in position freely to leave and enter the recess.

When used as a plug-in and for touch tests, the contact element 36 is reversed, and the gripper portion contacts the shoulder 23 and thereby limits the inward or retractive movement of the rod 31 and maintains the contact portion 37 in a fixed protruding position, as seen in Fig. 4.

A probe as described herein is adapted to be used in testing any apparatus or appliance within the size range of the device. Various sizes may be provided for diverse classes of work. The probe may be made sufficiently large for use in "hot line work" on power lines and distributing circuits.

Although I have described herein a preferred form of the invention, it is obvious that changes and modifications thereof may be made without departing from the scope of the invention as defined by the following claims.

I claim:

1. In a device of the class described, inner and outer telescopic insulating members, a nose piece on the outer end of said outer member, a spring interposed between said nose piece and the inner end of said inner member, said nose piece having a substantially axial bore in the inner end thereof, a laterally extended chamber below said bore containing a shoulder, and the lower end of said chamber being extended laterally in the opposite direction and having a second shoulder, a conductor rod disposed longitudinally in said telescopic members, the upper end of said rod having a laterally extending part as a stop engaging the upper end of said inner member, the lower portion of said rod extending through said axial bore and then offset in said chamber as a stop to engage said first-mentioned shoulder in said nose piece, and a terminal portion, and a contact member pivotally connected to said terminal portion near its free end and normally disposed substantially parallel thereto with a part projecting therebeyond, the part of said contact member on one side of the pivot comprising a substantially straight "plug-in" and "touch" element and the part of said contact member on the other side of said pivot comprising a laterally disposed gripper element the stop on said rod normally engaging the first said shoulder in said nose piece when the gripper element is outermost and the gripper element engaging the second said shoulder when the "plug-in" and "touch" element is extended.

2. In an electric probe, an elongated body, a rod longitudinally shiftable therein, an elongated probe member pivotally mounted on an end portion of said rod and disposed substantially parallel thereto, said member comprising a substantially straight probe element on one side of the pivot and a laterally extending element on the other side thereof capable of engaging under a wire, said member being reversible on its pivot to bring either of said elements beyond the end of said body, resilient means urging said member inwardly of said body, means to project said member outwardly from an end of said body, and means to connect an electric conductor with said rod.

3. In an electric probe, an elongated body comprising at one end a wedge-shaped nose open at its outer end between substantially parallel side walls, a rod longitudinally movable in said body including a laterally extending end part to engage under a wire, means to project said part outside of said nose, resilient means normally retaining said part inside of said nose and capable of causing said part to draw an engaged wire against end edges of said side walls, and means to connect an electric conductor with said rod.

4. In an electric probe, an elongated body, a probe nose on one end of said body, said nose having an axial bore in its portion adjacent to said body, a chamber aligned with said bore and in communication with the bore end remote from said body, said chamber containing a first shoulder at one side thereof and a second shoulder at the opposite side thereof and near the free end of said nose, a rod shiftable longitudinally in said body, the lower portion of said rod extending straight through said bore and thence offset in said chamber to contact with said first shoulder and thence continuing as a substantially straight terminal portion, a contact member pivotally mounted on said terminal portion, the part of said contact member on one side of the pivot being a substantially straight element and the part on the other side of said pivot having a laterally disposed element to engage under a wire, said contact member being reversible on its pivot to bring either of said elements to outermost position, the offset on said rod normally contacting said first shoulder when said laterally extending element is outermost and said laterally extending element normally contacting said second shoulder when said substantially straight element is outermost, resilient means urging said contact member inwardly of said nose, means to project said contact member outwardly of said nose, and means, and means to connect an electric conductor with said rod.

MAX J. SPENDLOVE.

REFERENCES CITED

The following references are of record in the file of this patent:

UNITED STATES PATENTS

| Number | Name | Date |
|---|---|---|
| 411,093 | Coughlin | Sept. 17, 1889 |
| 1,650,779 | Williams | Nov. 29, 1927 |
| 2,074,324 | Brown | Mar. 23, 1937 |
| 2,222,110 | Maurer | Nov. 19, 1940 |
| 2,438,350 | Reichard | Mar. 23, 1948 |

FOREIGN PATENTS

| Number | Country | Date |
|---|---|---|
| 295,939 | Italy | of 1932 |